United States Patent
Naruse

(10) Patent No.: US 8,228,303 B2
(45) Date of Patent: Jul. 24, 2012

(54) INFORMATION COMMUNICATION APPARATUS AND METHOD OF CONTROLLING INFORMATION COMMUNICATION APPARATUS

(75) Inventor: Tetsuya Naruse, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 821 days.

(21) Appl. No.: 12/392,601

(22) Filed: Feb. 25, 2009

(65) Prior Publication Data

US 2009/0251339 A1    Oct. 8, 2009

(30) Foreign Application Priority Data

Apr. 2, 2008   (JP) ................................. 2008-096660

(51) Int. Cl.
  *G06F 3/041* (2006.01)
(52) U.S. Cl. ........................... 345/173; 341/33; 455/41.1
(58) Field of Classification Search .......... 345/173–183; 341/33; 455/41.1
  See application file for complete search history.

(56) References Cited

U.S. PATENT DOCUMENTS

| | | | | |
|---|---|---|---|---|
| 5,650,597 A * | 7/1997 | Redmayne | ................. | 178/18.06 |
| 7,124,041 B1 * | 10/2006 | Johnson et al. | ................. | 702/58 |
| 8,036,595 B2 * | 10/2011 | Glass et al. | ................. | 455/41.1 |
| 2005/0210282 A1 | 9/2005 | Ohmori | | |
| 2008/0055266 A1 * | 3/2008 | Harada et al. | ................. | 345/173 |
| 2009/0040190 A1 * | 2/2009 | Nihei et al. | ................. | 345/173 |

FOREIGN PATENT DOCUMENTS

| | | |
|---|---|---|
| JP | 2006-195925 | 7/2006 |
| JP | 2007-36544 | 2/2007 |
| WO | WO 00/16236 | 3/2000 |
| WO | WO 00/54131 | 9/2000 |
| WO | WO 2006/034143 A2 | 3/2006 |

OTHER PUBLICATIONS

Chinese Office Action issued Dec. 12, 2011 in patent application No. 200910130227.7 (with English translation).

* cited by examiner

*Primary Examiner* — Kevin M Nguyen
*Assistant Examiner* — Sepideh Ghafari
(74) *Attorney, Agent, or Firm* — Oblon, Spivak, McClelland, Maier & Neustadt, L.L.P.

(57) ABSTRACT

An information communication apparatus includes: an electrostatic panel unit that is at least provided with an electrostatically chargeable panel surface; a capacitance detection unit that detects a capacitance variation of the panel surface to detect a location at which an object substantially contacts the panel surface; an electric field communication unit that uses the panel surface as an electrostatic field antenna to carry out electrostatic field communication; a connection switching unit that selectively connects any one of the capacitance detection unit and the electric field communication unit to the electrostatic panel unit; and a control unit that controls the connection switching unit to connect the electrostatic panel unit to the capacitance detection unit at the time of detecting a location at which an object contacts the panel surface and to connect the electrostatic panel unit to the electric field communication unit at the time of the electrostatic field communication.

9 Claims, 16 Drawing Sheets

FIG. 15

|     | B00   | B01   | B10   | B11   |
|-----|-------|-------|-------|-------|
| A00 | 0 → 0 | 0 → 0 | 0 → 0 | 0 → 0 |
| A01 | 0 → 0 | 0 → 1 | 0 → 0 | 0 → 0 |
| A10 | 0 → 0 | 0 → 0 | 0 → 0 | 0 → 0 |
| A11 | 0 → 0 | 1 → 0 | 0 → 0 | 0 → 1 |

\* "0" WHEN DISCONNECTED, "1" WHEN CONNECTED

FIG. 17

|  | B00 | B01 | B10 | B11 |
|---|---|---|---|---|
| A00 | 0→0 | 0→0 | 0→0 | 0→0 |
| A01 | 0→0 | 1→0 | 0→0 | 0→1 |
| A10 | 0→0 | 0→0 | 0→0 | 0→0 |
| A11 | 0→0 | 0→0 | 0→0 | 1→0 |

\* "0" WHEN DISCONNECTED, "1" WHEN CONNECTED

FIG. 18

EXAMPLE OF ALLOCATION OF ACTIONS
(A00, B00), (A00, B01), (A00, B10), (A00, B11),
(A01, B00), (A01, B01), (A01, B10), (A01, B11),
(A10, B00), (A10, B01), (A10, B10), (A10, B11),
(A11, B00), (A11, B01), (A11, B10), (A11, B11)

|  | PREVIOUS STATUS | FOLLOWING STATUS |  |
|---|---|---|---|
| MODE 1 | 0100, 1000, 0001, 0010 | UNCHANGED | MUSIC MODE |
| MODE 2 | 1000, 0010, 0100, 0001 | UNCHANGED | ANIMATION MODE |
| .... | .... | .... | .... |
| ACTION 1 | 0000, 0100, 0000, 0001 | 0000, 0000, 0000, 0100 | CURSOR ↓ |
| ACTION 2 | 0000, 0100, 0000, 0001 | 0000, 0001, 0000, 0000 | CURSOR ↑ |
| .... | .... | .... | .... |

INFORMATION COMMUNICATION APPARATUS AND METHOD OF CONTROLLING INFORMATION COMMUNICATION APPARATUS

BACKGROUND OF THE INVENTION

1. Field of the Invention

The invention relates to an information communication apparatus equipped with a so-called touch sensor that is able to detect a location, at which a finger, or the like, substantially contacts, by detecting a variation in capacitance, and a method of controlling the information communication apparatus.

2. Description of the Related Art

Japanese Unexamined Patent Application Publication No. 2007-36544 (FIG. 1) describes a technique that, in a cellular phone formed of an upper casing having a display unit and a lower casing having a touch panel unit, the touch panel is a touch panel display, which displays various operating buttons on its surface in accordance with an application being executed and acquires a contact operation of the user on the displayed operating buttons as an instruction input, only operating buttons that may be necessary are displayed on the screen of the touch panel unit in response to the operating status of the application, and the remaining space is used for displaying information to thereby display information on both the display unit and the touch panel unit, thus making it possible to increase the amount of information displayed at a time.

SUMMARY OF THE INVENTION

With the above described touch panel, because various and flexible user input is possible, it is conceivable that it is considerably effective to mount the touch panel on a high-performance and multi-functional mobile information terminal, such as a recent cellular phone terminal. However, the touch panel is basically used only as a man-machine interface device between the user and the terminal, and is not used in another way.

Incidentally, in recent years, a cellular phone terminal, or the like, having the function of carrying out data communication in a non-contact state (non-contact communication function) by means of electromagnetic induction, has been widely used. The non-contact communication using the electromagnetic induction is not necessary to connect a cable, or the like, so data communication may be simply carried out. In addition, communication only within a considerably close distance is allowed, so it is possible to easily ensure high security in comparison with, for example, wireless radio communication. However, in the case of the non-contact communication using the electromagnetic induction, the data communication speed is not constantly high and, therefore, it may be not suitable for applications of transmitting large amount of data for a short period of time. Of course, if a communication device that enables high-speed large-amount communication is additionally mounted, transmission of large amount of data for a short period of time is possible; however, it is not desirable to additionally mount another communication device, or the like, in the cellular phone terminal, or the like, for which reduction in size and thickness is desired. Particularly, in the case of a wireless communication device or non-contact communication device that is able to simply carry out data communication without using a cable, or the like, an antenna having a certain size may be necessary. For this reason, it should be avoided to provide an additional antenna, or the like, in the cellular phone terminal, or the like.

There is a necessary for providing an information communication apparatus that is able to simply carry out high-speed large-amount data transmission within a close distance that can ensure high security while being equipped with a touch panel that enables various and flexible user input, and a method of controlling the information communication apparatus.

According to an embodiment of the invention, an information communication apparatus includes: an electrostatic panel unit that is at least provided with an electrostatically chargeable panel surface; a capacitance detection unit that detects a variation in capacitance of the panel surface of the electrostatic panel unit to detect a location at which an object substantially contacts the panel surface; an electric field communication unit that uses the panel surface of the electrostatic panel unit as an electrostatic field antenna to carry out electrostatic field communication; a connection switching unit that selectively connects any one of the capacitance detection unit and the electric field communication unit to the electrostatic panel unit; and a control unit that controls the connection switching unit so as to connect the electrostatic panel unit to the capacitance detection unit at the time of detecting a location at which an object contacts the panel surface of the electrostatic panel unit and to connect the electrostatic panel unit to the electric field communication unit at the time of the electrostatic field communication.

In addition, according to another embodiment of the invention, a method of controlling an information communication apparatus, includes the steps of: detecting a variation in capacitance of an electrostatically chargeable panel surface, which is at least provided for an electrostatic panel unit, by a capacitance detection unit to detect a location at which an object substantially contacts the panel surface; using the panel surface of the electrostatic panel unit as an electrostatic field antenna to carry out electrostatic field communication by an electric field communication unit; and connecting the electrostatic panel unit to the capacitance detection unit by a connection switching unit at the time of detecting a location at which an object contacts the panel surface of the electrostatic panel unit and connecting the electric field communication unit to the electrostatic panel unit by the connection switching unit at the time of the electrostatic field communication.

According to the embodiments of the invention, the electrostatically chargeable panel surface of the electrostatic panel unit, for example, like a so-called touch panel, is configured to be usable as an antenna for electrostatic field communication.

BRIEF DESCRIPTION OF THE DRAWINGS

FIG. 15 is a table that shows the connection status of the electric field communication antennas and its change in the example of FIG. 14A and FIG. 14B;

FIG. 17 is a table that shows the connection status of the electric field communication antennas and its change in the example of FIG. 16A and FIG. 16B;

FIG. 18 is a table that shows a correspondence between a code, which indicates a combination of paired electric field communication antennas in connected state and changes of the paired electric field communication antennas, and an operation mode or action of the terminal in the second usage example of the embodiment;

DESCRIPTION OF THE PREFERRED EMBODIMENTS

Hereinafter, an embodiment of the invention will be described with reference to the accompanying drawings.

In the present embodiment, a cellular phone terminal provided with a touch sensor that is able to detect a location at which a finger, or the like, substantially contacts by detecting a variation in capacitance is taken as an example of application of an information communication apparatus according to the invention, and a method of controlling information communication in a cellular phone terminal as an example of application of a method of controlling an information communication apparatus according to the invention. However, the content described here is, of course, just illustrative, and the embodiments of the invention are not limited to these examples.

Schematic Configuration of Cellular Phone Terminal

Figure 1:
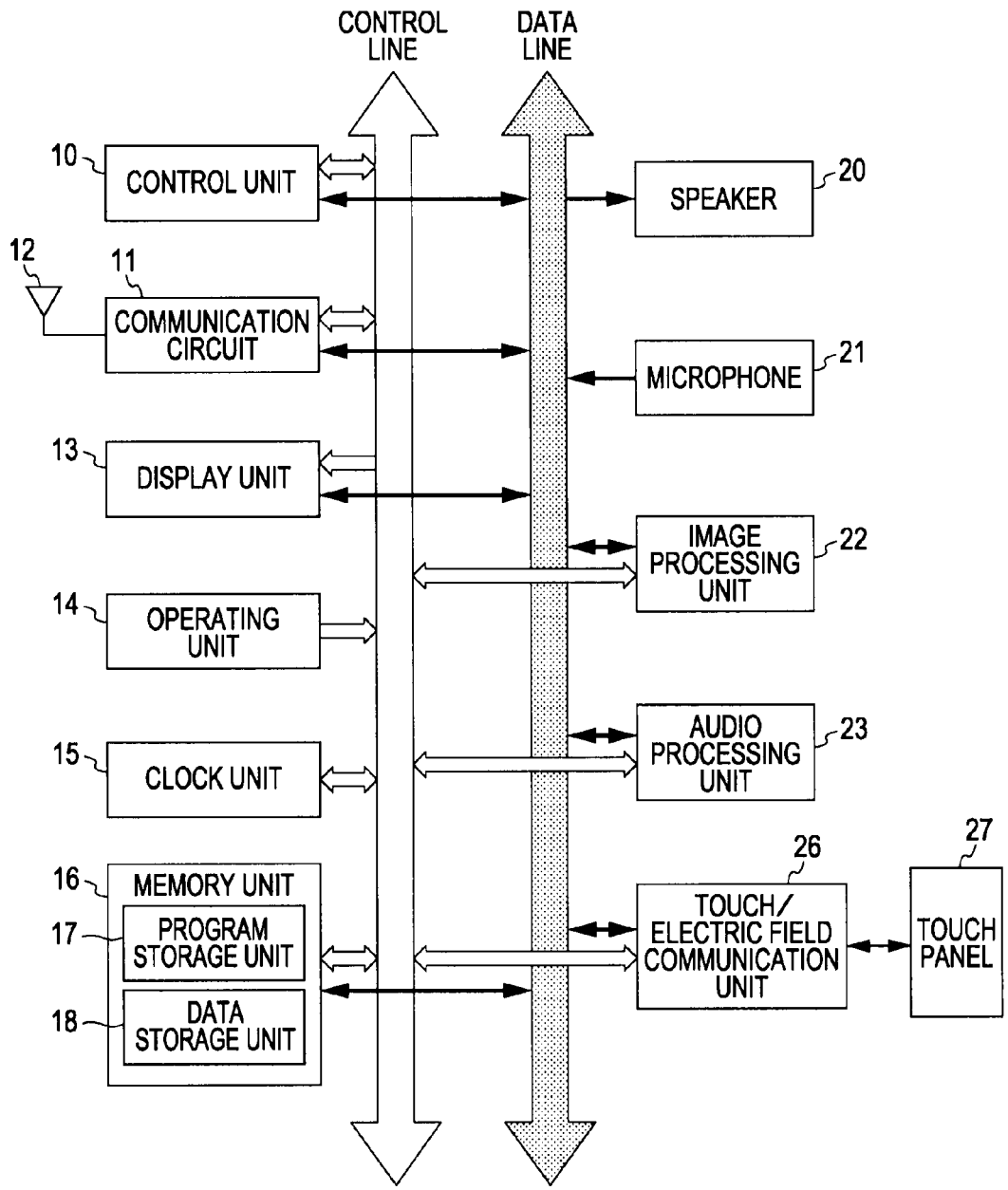
FIG. 1 is a block diagram that shows the schematic configuration of a cellular phone terminal according to an embodiment of the invention.

FIG. 1 shows the schematic configuration of a cellular phone terminal according to the present embodiment.

In FIG. 1, a communication antenna 12 is, for example, an internal antenna, and transmits and receives signal radio waves for telephone calls and packet communications such as e-mails. A communication circuit 11 converts, modulates and decodes the frequencies of transmission and reception signals.

A control unit 10 is formed of a CPU (central processing unit). The control unit 10 executes a control for communication in the communication circuit 11, a control for audio processing, a control for image processing, processing and control of contact location detection and electrostatic field communication in a touch/electric field communication unit 26, which will be described later, controls for other various signal processings and various units, a control for setting an operation mode, which will be described later, a control for selecting an action, and the like. In addition, the control unit 10 executes various control programs and application programs stored in a memory unit 16 and executes associated various data processings, and the like.

A speaker 20 is formed of a receiving speaker provided for the cellular phone terminal, and a speaker for outputting a ringer (ring tone), alarm tone, warning tone, reproduced music, digital audio, audio of reproduced animation. The speaker 20 converts an audio signal supplied from an audio processing unit 23 into acoustic waves and outputs the acoustic waves into the air.

A microphone 21 is a microphone for transmission and external audio collection. The microphone 21 converts acoustic waves into an audio signal and inputs the audio signal to the audio processing unit 23.

The audio processing unit 23 converts digital audio data, generated through predetermined audio processing such as decoding, into an analog signal and amplifies the converted audio signal, and then outputs the amplified audio signal to the speaker 20. In addition, the audio processing unit 23 amplifies an input audio signal supplied from the microphone 21 and converts the amplified audio signal into digital audio data, and then executes predetermined audio processing such as encoding over the converted audio data.

An operating unit 14 is formed of operating pieces and an operating signal generator. The operating pieces include a cross key, a jog dial, and keys such as a numeric keypad, a speech key and an on-hook/power key, which are provided on a casing of the cellular phone terminal according to the present embodiment. The operating signal generator generates an operating signal when those operating pieces are operated.

A display unit 13 includes a display device, such as a liquid crystal display or an organic EL (ElectroLuminescent) display, and a display driving circuit for the display. The display unit 13, for example, displays various characters and messages of an e-mail or displays a still picture or an animation on the display on the basis of image signals supplied from an image processing unit 22.

The image processing unit 22 generates image signals of characters, symbols, images, or the like, displayed on the display unit 13. In addition, the image processing unit 22 displays various user interface screens, web pages, or the like, under the control of the control unit 10.

A clock unit 15 generates time information, such as year, month and day or date and time, time period information used in measuring a period of time set by a user, or the like. The time, time period, or the like, generated by the clock unit 15 is displayed on the screen of the display unit 13 or used when the control unit 10 manages various time periods.

A touch panel 27 is an electrostatic panel unit that can be at least charged with static electricity. In addition, in the case of the present embodiment, the touch panel 27 can also be used as an electrostatic field communication antenna for carrying out information transmission by means of so-called electric field communication. Note that in the present embodiment, the screen of the display unit 13 may be arranged below (on the casing side) the touch panel 27.

The touch/electric field communication unit 26 has a contact detection function for using the touch panel 27 as a so-called contact detection device and an electric field communication function for causing the touch panel 27 to operate as an electric field communication antenna for electrostatic field communication, and is able to appropriately switch those contact detection function and the electric field communication function. The contact detection function detects a location at which the capacitance of a panel surface of the touch panel 27 varies when an object, such as a finger, substantially contacts the panel surface to cause change the capacitance of the panel surface as a location at which the object contacts. In addition, the electric field communication function, when a signal is transmitted through electrostatic field communication, changes electrostatic field strength on the panel surface of the touch panel 27 on the basis of the transmission signal, while the electric field communication function, when a signal is received through electrostatic communication, detects electrostatic field strength that varies on the panel surface of the touch panel 27 in response to a variation in electrostatic field strength caused by electric field communication antenna of an electric field communication terminal at the other side of communication to thereby receive a transmission signal from the electric field communication terminal at the other side of communication. The detailed configuration and operation of the touch/electric field communication unit 24 will be described later.

Note that the basic principles, or the like, of electrostatic field communication is an existing technique as described, for example, in Japanese Unexamined Patent Application Publication No. 2005-227874, so the detailed description thereof is omitted. The electrostatic field communication generally has high space diversity effect and enables high-speed data transmission.

The memory unit 16 includes a ROM (Read Only Memory) and a RAM (Random Access Memory). The ROM includes a rewriteable storage medium, such as a NAND-type flash memory. The ROM stores, for example, an OS (Operating System) program, a control program by which the control unit 10 controls various units, various application programs, various data content, various default setting values, font data, various dictionary data, model name information, terminal identification information, or the like. Note that the above programs are stored in a program storage unit 17, and various data are stored in a data storage unit 18. The RAM is used as a work area when the control unit 10 executes various data processings or used as a temporary storage area in which data transmitted or received by electric field communication, or the like, are temporarily stored. In addition, the programs of the memory unit 16 may be stored through a disk-shaped recording medium, an external semiconductor memory, or the like, or may be stored through a cable via an external interface or stored wirelessly.

Other than that, although not shown in FIG. 1, the cellular phone terminal according to the present embodiment also includes various components that are provided for a typical cellular phone terminal, such as a digital camera unit for taking a photographic image, a LED (light-emitting diode) for key illumination, incoming light, or the like, and its driving unit, a battery that supplies electric power to the units, a power management IC unit that controls the electric power, a short distance wireless communication unit for carrying out short distance wireless communication by a so-called Bluetooth (trademark), a UWB (Ultra Wide Band), a wireless LAN (Local Area Network), or the like, a noncontact communication processing unit having a noncontact IC card function and a reader/writer function, a GPS (Global Positioning System) communication unit, an external memory slot, a digital broadcast receiving tuner unit, an AV codec unit, and the like.

Configuration of Touch/Electric Field Communication Unit

Figure 2:
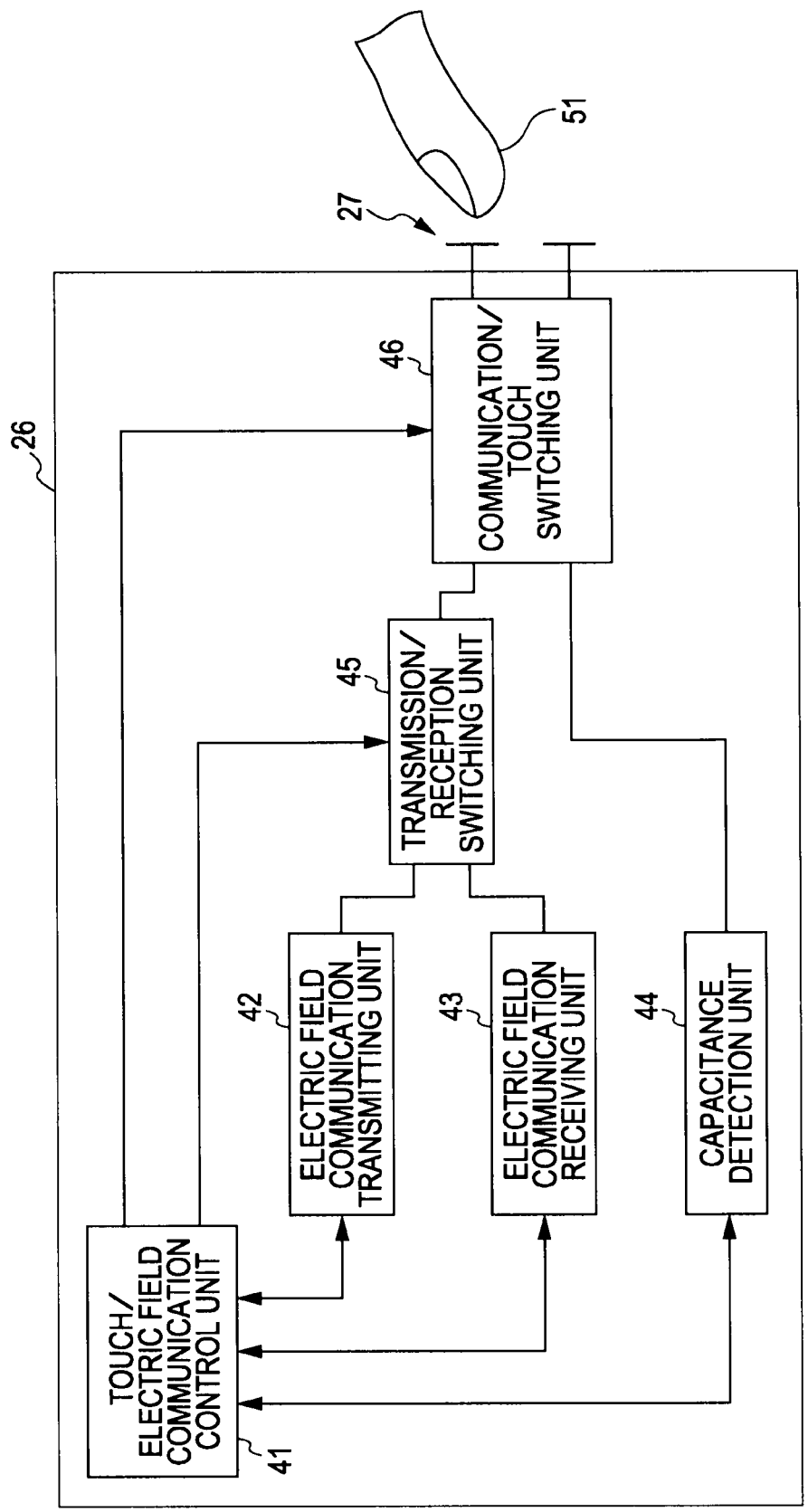
FIG. 2 is a view that shows the configuration example of a touch/electric field communication unit of the cellular phone terminal according to the embodiment of the invention, and that shows an example in which a touch panel is used as a normal contact detection device.
Figure 3:
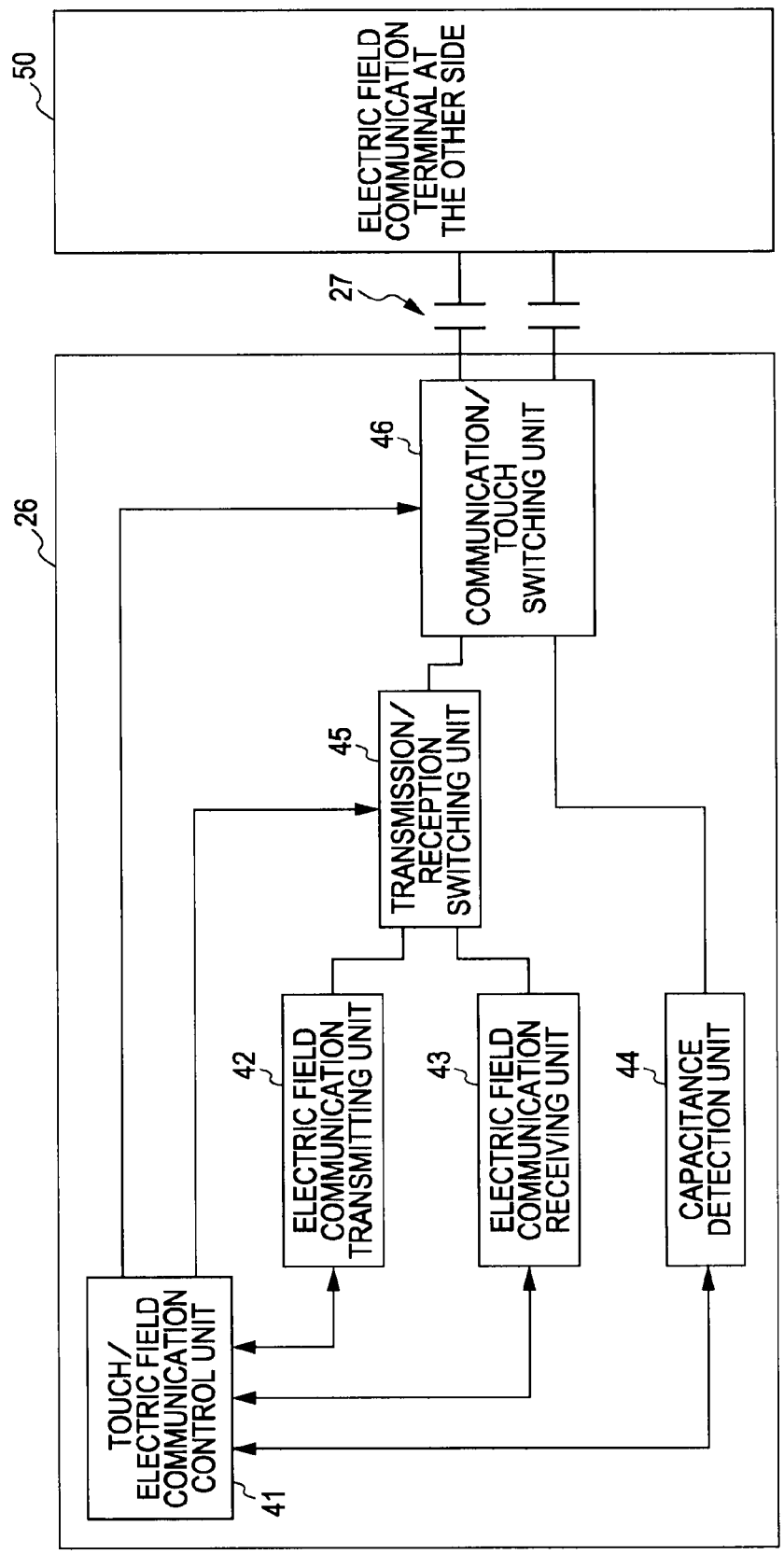
FIG. 3 is a view that shows the configuration example of the touch/electric field communication unit of the cellular phone terminal according to the embodiment of the invention and that shows an example in which the touch panel is used as an electric field communication antenna to carry out electrostatic field communication with another electric field communication terminal.

FIG. 2 and FIG. 3 show an example of configuration of the touch/electric field communication unit 26. Note that FIG. 2 shows the case in which the touch panel 27 is used as a normal contact detection device, and FIG. 3 shows the case in which the touch panel 27 is used as an electric field communication antenna to carry out electrostatic field communication with another electric field communication terminal 50.

As shown in FIG. 2, when the touch panel 27 is used as the normal contact detection device, the touch electric field communication control unit 41 controls to switch the communication/touch switching unit 46 so that the touch panel 27 is connected with a capacitance detection unit 44.

At this time, the touch electric field communication control unit 41 controls the capacitance detection unit 44, applies electric charge from the capacitance detection unit 44 through the communication/touch switching unit 46 to the touch panel 27, and then causes all the panel surface of the touch panel 27 to be electrically charged. Note that it is also applicable that the communication/touch switching unit 46 applies electric charge to the touch panel 27. Then, the capacitance detection unit 44 senses a variation in capacitance on the panel surface of the touch panel 27 and, when detecting a variation in capacitance because of a substantial contact of, for example, a finger 51, or the like, on the panel surface through the sensing, generates two-dimensional coordinate data on the panel surface, indicating a location at which the capacitance is varied, that is, a location at which the finger 51, or the like, substantially contacts. The two-dimensional coordinate data are transmitted through the touch electric field communication control unit 41 to the above described control unit 10.

Thus, the control unit 10 is able to recognize which the finger 51, or the like, contacts the panel surface of the touch panel 27.

As shown in FIG. 3, when the touch panel 27 is used as an electric field communication antenna to carry out electrostatic field communication with another electric field communication terminal 50, the touch electric field communication control unit 41 controls to switch the communication/touch switching unit 46 so as to connect the touch panel 27 with the transmission/reception switching unit 45.

Here, when the touch panel 27 is used as a transmission side electric field communication antenna, the touch electric field communication control unit 41 controls to switch the a transmission/reception switch 45 so as to connect the touch panel 27, connected through the communication/touch switching unit 46, with the electric field communication transmitting unit 42.

At this time, the electric field communication transmitting unit 42 is supplied with a transmission signal of electric field communication from the above described control unit 10 through the touch electric field communication control unit 41. The electric field communication transmitting unit 42 changes electrostatic field strength formed on the panel surface of the touch panel 27, connected through the transmission/reception switching unit 45 and the communication/touch switching unit 46, in response to the transmission signal.

Thus, the electric field communication antenna (this may be a touch panel) of the electric field communication terminal 50 at the other side of communication detects a variation in electrostatic field strength in the touch panel 27 and then acquires the detected signal as a reception signal.

On the other hand, when the touch panel 27 is used as a reception side electric field communication antenna, the touch electric field communication control unit 41 controls to switch the transmission/reception switch 45 so as to connect the touch panel 27, connected through the communication/touch switching unit 46, with an electric field communication receiving unit 43.

At this time, the electric field communication receiving unit 43 detects a variation in electrostatic field strength on the panel surface of the touch panel 27, connected through the transmission/reception switching unit 45 and the communication/touch switching unit 46, that is, detects a variation in electrostatic field strength due to the electric field communication antenna of the electric field communication terminal 50 at the other side of communication, to acquire the detected signal as a reception signal.

Then, the electric field communication receiving unit 43 transfers the reception signal through the touch electric field communication control unit 41 to the above described control unit 10.

Thus, the control unit 10 is able to receive a signal transmitted from the electric field communication terminal 50 at the other side of communication.

Note that the electric field communication terminal 50 at the other side of communication, as well as the cellular phone terminal of the present embodiment, may be the one that can use a touch panel as an electric field communication antenna.
Usage Example of Electric Field Communication Antenna Formed in Touch Panel In the cellular phone terminal according to the present embodiment, the panel surface of the touch panel 27 is divided into a plurality of areas and then those areas are respectively used as independent electric field communication antennas to thereby enable high-speed data transmission by multiplexing, setting of an operation mode of the cellular phone terminal, a control for launching an application program, or the like, as describe above. Note that when the areas on the panel surface of the touch panel 27 are used as electric field communication antennas, the electric field communication transmitting unit 42 shown in FIG. 3 changes electrostatic field strength of each panel area portion, expressed by a two-dimensional coordinate range corresponding to each area of the touch panel 27, in response to a transmission signal to thereby transmit a signal from the electric field communication antenna of each are, while the electric field communication receiving unit 43 shown in FIG. 3 detects a variation in electrostatic field strength of the panel area portion, expressed by a two-dimensional coordinate range, corresponding to each area of the touch panel 27 to thereby receive a signal using the electric field communication antenna of each area.

FIRST USAGE EXAMPLE

Figure 4:
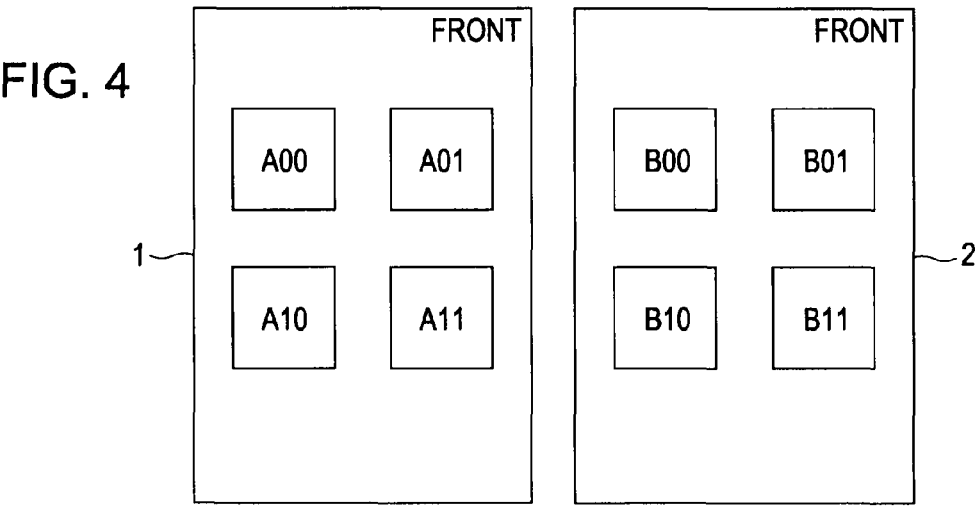
FIG. 4 is a schematic view of two cellular phone terminals, each of which is provided with four electric field communication antennas formed and arranged in a grid in the touch panel, in a state where the cellular phone terminals are respectively placed as viewed from the front according to a first usage example of the embodiment of the invention.

FIG. 4 shows a conceptual view of electric field communication antennas on a touch panel of a cellular phone terminal 1 and a touch panel of a cellular phone terminal 2 when the cellular phone terminal 1 includes four areas inside the touch panel arranged on one of the casing surfaces thereof and then those four areas are respectively used as independent electric field communication antennas (hereinafter, the antennas are respectively referred to as A00, A01, A10 and A11), and, similarly, the cellular phone terminal 2 includes four areas inside the touch panel arranged on one of the casing surfaces thereof and then those four areas are respectively used as independent electric field communication antennas (hereinafter, the antennas are respectively referred to as B00, B01, B10 and B11). Note that in the examples of FIG. 4, the four electric field communication antennas A00, A01, A10, A11 formed on the touch panel of the cellular phone terminal 1 and the four electric field communication antennas B00, B01, B10, B11 formed on the touch panel of the cellular phone terminal 2 are respectively arranged in a grid.

Note that the example of FIG. 4 shows the state of arrangement when the electric field communication antennas A00, A01, A10, A11 on the touch panel of the cellular phone terminal 1 and the electric field communication antennas B00, B01, B10, B11 on the touch panel of the cellular phone terminal 2 are respectively viewed in the same direction, that is, for example, when viewed from the front of the terminals.

In the first usage example, when considering that the cellular phone terminals 1 and 2 located to face each other so that the electric field communication antennas A00, A01, A10, A11 face the antennas B00, B01, B10, B11 in one-to-one correspondence with each other, and electrostatic field communication is carried out respectively between the electric field communication antennas that face each other in one-to-one correspondence with each other, the pair of electric field communication antenna A00 of the cellular phone terminal 1 and the electric field communication antenna B01 of the cellular phone terminal 2 are in connected state, and, similarly, the pair of electric field communication antenna A01 of the cellular phone terminal 1 and electric field communication antenna B00 of the cellular phone terminal 2 are in connected state, the pair of electric field communication antenna A10 of the cellular phone terminal 1 and electric field communication antenna B11 of the cellular phone terminal 2 are in connected state, and the pair of electric field communication antenna A11 of the cellular phone terminal 1 and electric field communication antenna B10 of the cellular phone terminal 2 are in connected state.

Here, in the case of electrostatic field communication, the space diversity effect is high. Thus, even when the plurality of electric field communication antennas are formed on the touch panel as in the case of this example, it is less likely that interference is problematic between those antennas.

In addition, as in the case of the first usage example, when electrostatic field communication is carried out in respective pairs of the electric field communication antennas A00, A01, A10, A11 and antennas B00, B01, B10, B11 of the respective cellular phone terminals 1 and 2 that face each other in one-to-one correspondence with each other, for example, multi-channel communication is possible. In addition, when data multiplexing is performed using multi-channel communication, high-speed communication (high-speed communication of large amount of data) is possible.

That is, when multi-channel communication is carried out in the first usage example, the touch/electric field communication units 26 of the cellular phone terminals 1 and 2, for example, allocate channels to the respective paired (pairs connected by electric field communication) electric field communication antennas and carry out data communication through each of the allocated channels. By so doing, multi-channel communication between the cellular phone terminals 1 and 2 is implemented.

In addition, when data multiplexing is performed using multi-channel communication, the touch/electric field communication unit 26 of the transmission-side cellular phone terminal distributes data to a plurality of channels, and transmits the data distributed into the plurality of channels from the electric field communication antennas to which the channels are allocated. On the other hand, the touch/electric field communication unit 26 of the reception-side cellular phone terminal receives data of the respective channels through the electric field communication antennas to which the channels are allocated and then integrates those pieces of data distributed to the channels. By so doing, high-speed data communication between the cellular phone terminals 1 and 2 is implemented. That is, in this case, it is possible to implement high-speed communication that is further improved from an original high-speed data transmission characteristic of electric field communication.

In addition, in the first usage example of the present embodiment, FIG. 5 to FIG. 13 show conceptual views when paired electric field communication antennas (electric field communication antennas in connected state) are changed depending on the arrangement that the cellular phone terminal 1 is located adjacent to the cellular phone terminal 2, and then electric field communication is carried out between both cellular phone terminals 1 and 2. Note that the examples of FIG. 5 to FIG. 13 show the states of arrangement when both casing surfaces on which the respective electric field communication antennas of the cellular phone terminal 1 and cellular phone terminal 2 are provided are located adjacent to each other so as to face each other to enable electric field communication. That is, the state of arrangement of the cellular phone terminal 1 is such that the terminal is oriented toward the front, while the state of arrangement of the cellular phone terminal 2 is such that the terminal is oriented toward the rear. That is, in the case of FIG. 5 to FIG. 13, in the cellular phone terminal 1 as viewed from the front, the four electric field communication antennas appear like A00, A01, A10, A11 in the order of upper left, upper right, lower left and lower right in the drawings, while in the cellular phone terminal 2 as viewed from the rear, the four electric field communication antennas appear like B01, B00, B11, B10 in the order of upper left, upper right, lower left and lower right in the drawings.

Figure 5:
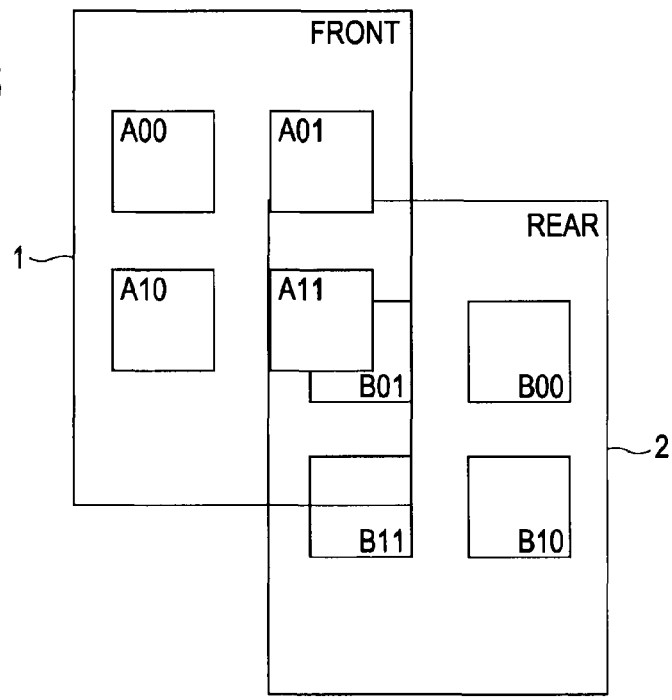
FIG. 5 is a view that shows an example of arrangement when a pair of the electric field communication antennas (A11) and (B01) are connected in the first usage example of the embodiment.
Figure 6:
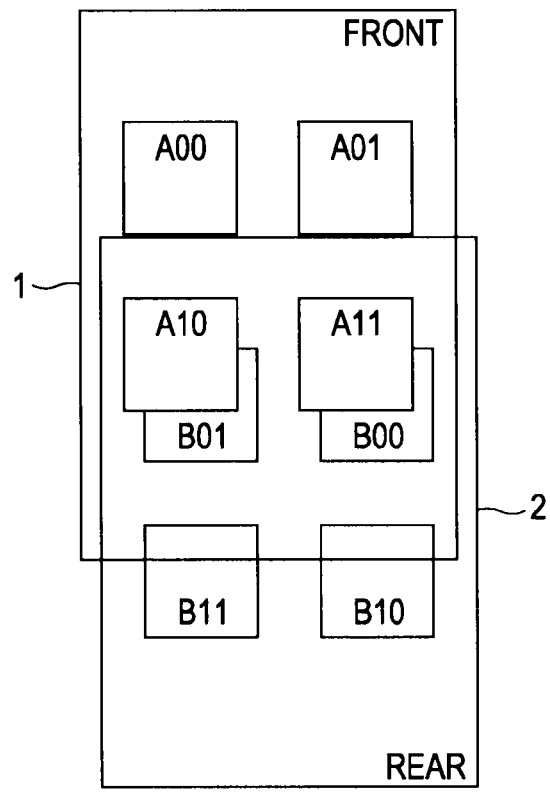
FIG. 6 is a view that shows an example of arrangement when a pair of the electric field communication antennas (A10) and (B01) and a pair of the electric field communication antennas (A11) and (B00) are connected in the first usage example of the embodiment.
Figure 7:
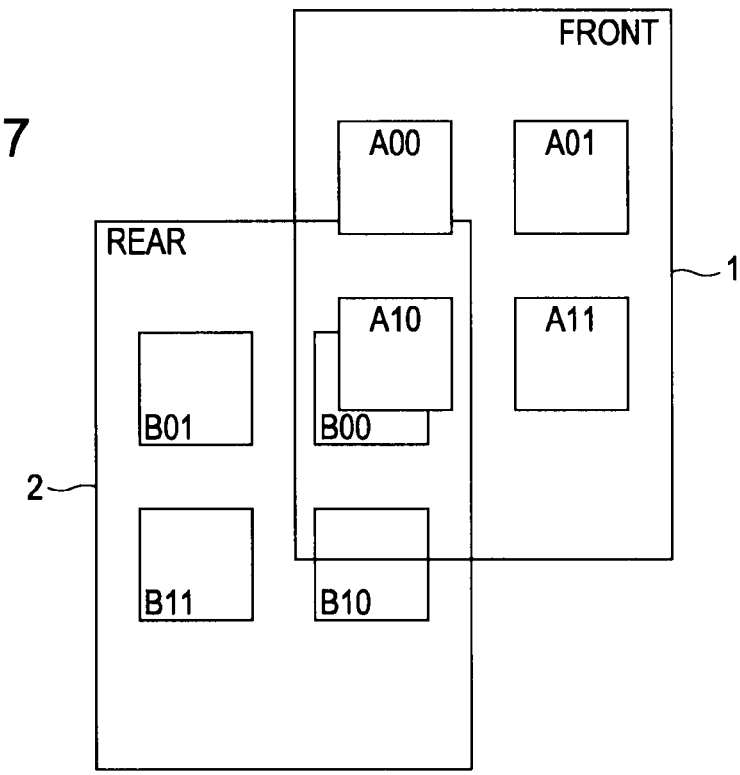
FIG. 7 is a view that shows an example of arrangement when a pair of the electric field communication antennas (A10) and (B00) are connected in the first usage example of the embodiment.
Figure 8:
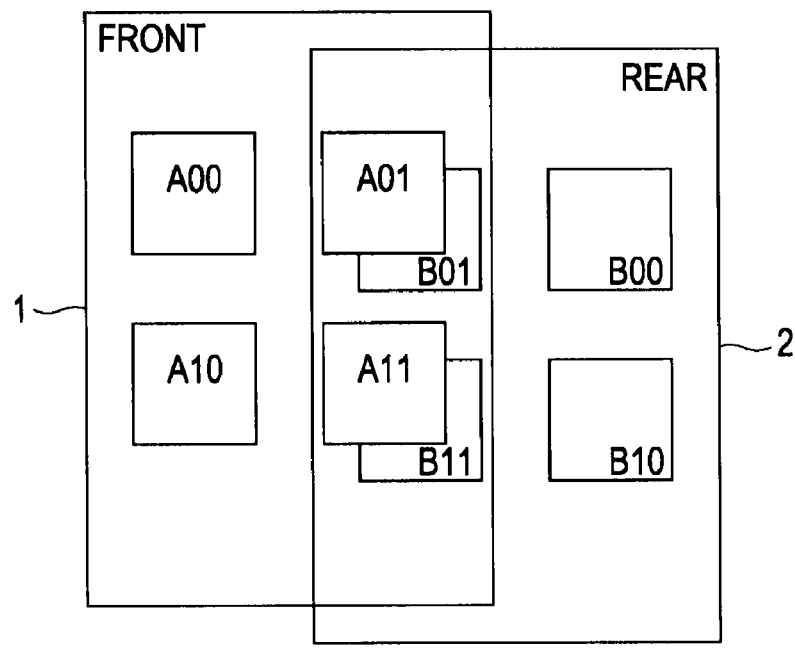
FIG. 8 is a view that shows an example of arrangement when a pair of the electric field communication antennas (A01) and (B01) and a pair of the electric field communication antennas (A11) and (B11) are connected in the first usage example of the embodiment.
Figure 9:
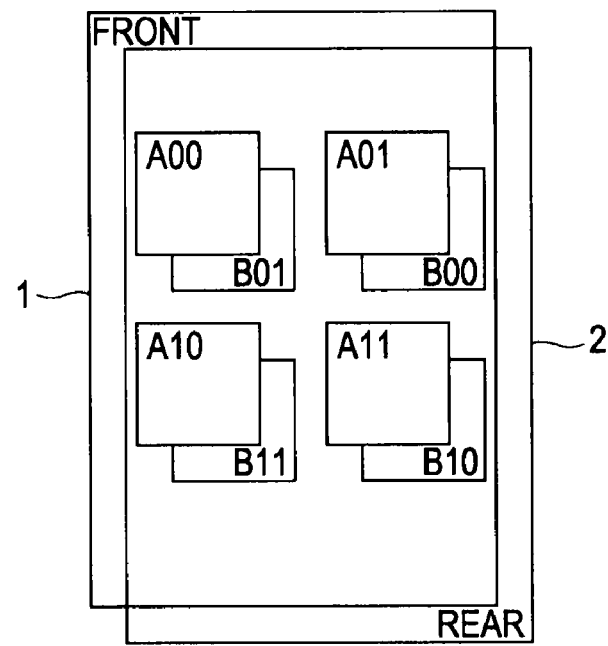
FIG. 9 is a view that shows an example of arrangement when a pair of the electric field communication antennas (A00) and (B01), a pair of the electric field communication antennas (A01) and (B00), a pair of the electric field communication antennas (A10) and (B11) and a pair of the electric field communication antennas (A11) and (B10) are respectively connected in the first usage example of the embodiment.
Figure 10:
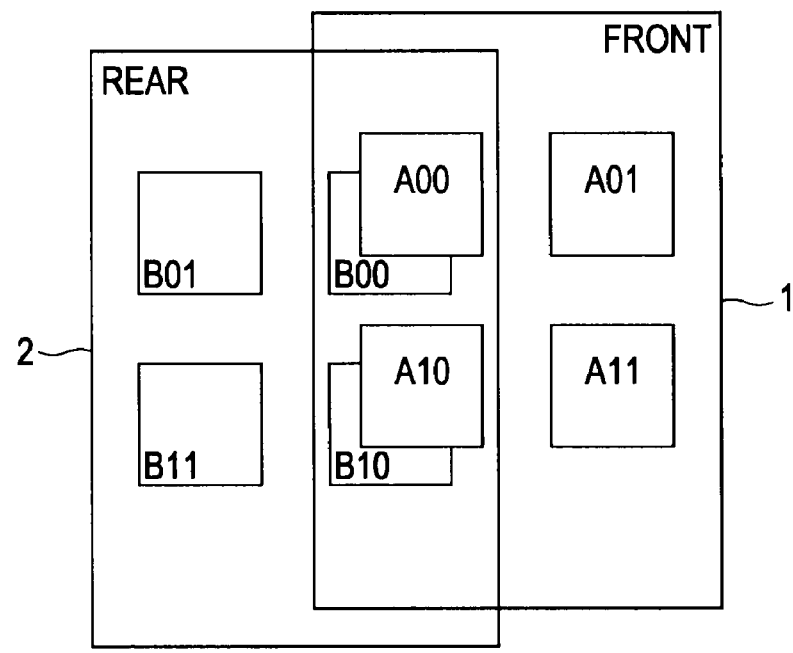
FIG. 10 is a view that shows an example of arrangement when a pair of the electric field communication antennas (A00) and (B00) and a pair of the electric field communication antennas (A10) and (B10) are connected in the first usage example of the embodiment.
Figure 11:
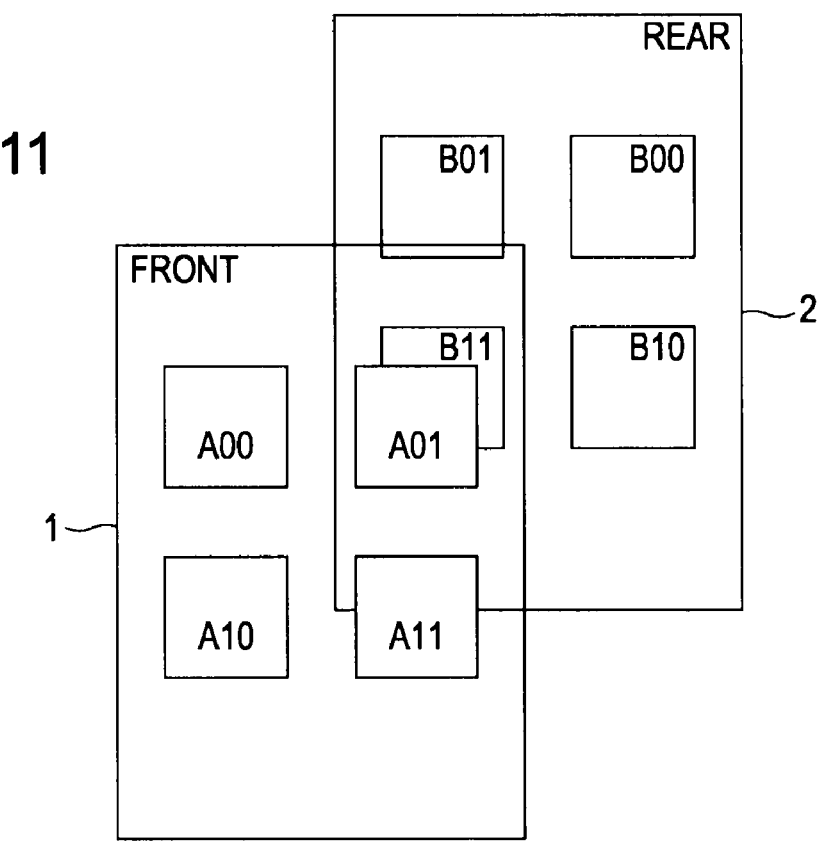
FIG. 11 is a view that shows an example of arrangement when a pair of the electric field communication antennas (A01) and (B11) are connected in the first usage example of the embodiment.
Figure 12:
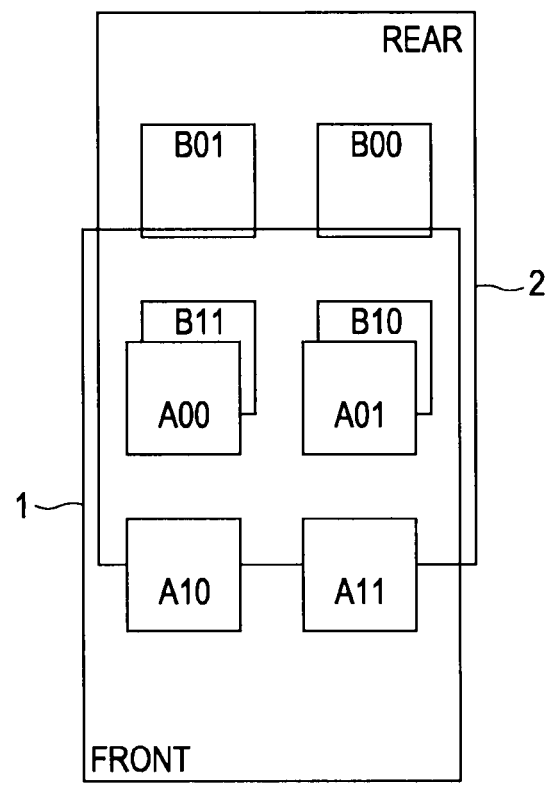
FIG. 12 is a view that shows an example of arrangement when a pair of the electric field communication antennas (A00) and (B11 and a pair of the electric field communication antennas (A01) and (B10) are connected in the first usage example of the embodiment.
Figure 13:
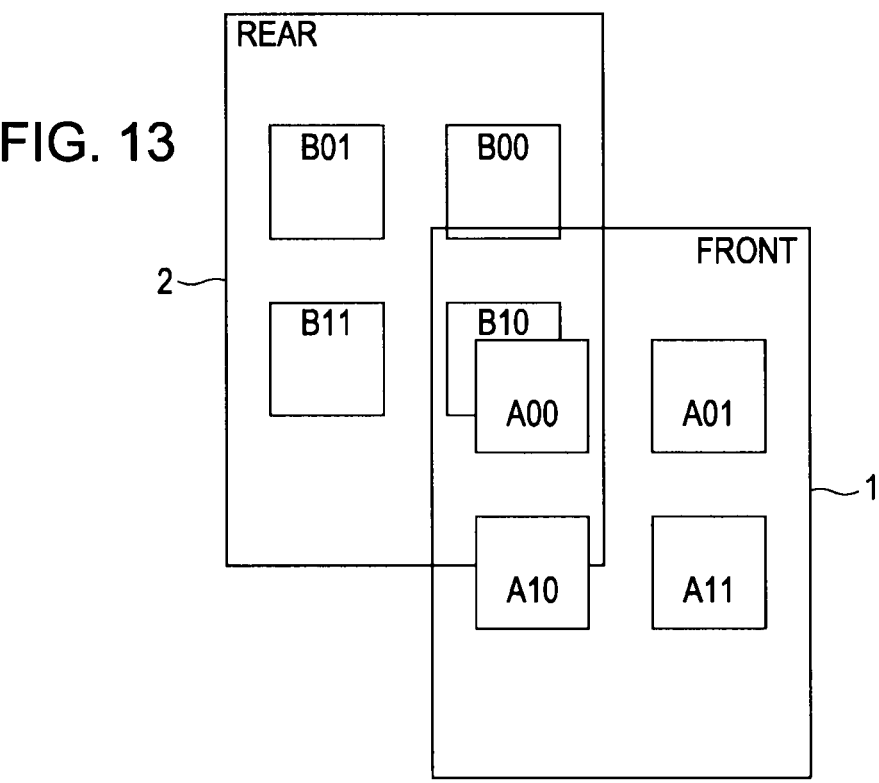
FIG. 13 is a view that shows an example of arrangement when a pair of the electric field communication antennas (A00) and (B10) is connected in the first usage example of the embodiment.

FIG. 5 shows an example of arrangement when the pair of the electric field communication antenna A11 of the cellular phone terminal 1 and the electric field communication antenna B01 of the cellular phone terminal 2 are in connected state. FIG. 6 shows an example of arrangement when the pair of the electric field communication antenna A10 of the cellular phone terminal 1 and the electric field communication antenna B01 of the cellular phone terminal 2 are in connected state and, similarly, the pair of the electric field communication antenna A11 of the cellular phone terminal 1 and the electric field communication antenna B00 of the cellular phone terminal 2 are in connected state. FIG. 7 shows an example of arrangement when the pair of the electric field communication antenna A10 of the cellular phone terminal 1 and the electric field communication antenna B00 of the cellular phone terminal 2 are in connected state. FIG. 8 shows an example of arrangement when the pair of the electric field communication antenna A01 of the cellular phone terminal 1 and the electric field communication antenna B01 of the cellular phone terminal 2 are in connected and, similarly, the pair of the electric field communication antenna A11 of the cellular phone terminal 1 and the electric field communication antenna B11 of the cellular phone terminal 2 are in connected state. FIG. 9 shows an example of arrangement when the pair of the electric field communication antenna A00 of the cellular phone terminal 1 and the electric field communication antenna B01 of the cellular phone terminal 2 are in connected state and, similarly, the pair of the electric field communication antenna A01 of the cellular phone terminal 1 and the electric field communication antenna B00 of the cellular phone terminal 2 are in connected state, the pair of the electric field communication antenna A10 of the cellular phone terminal 1 and the electric field communication antenna B11 of the cellular phone terminal 2 are in connected state, and the pair of the electric field communication antenna A11 of the cellular phone terminal 1 and the electric field communication antenna B10 of the cellular phone terminal 2 are in connected state. FIG. 10 shows an example of arrangement when the pair of the electric field communication antenna A00 of the cellular phone terminal 1 and the electric field communication antenna B00 of the cellular phone terminal 2 are in connected state and, similarly, the pair of the electric field communication antenna A10 of the cellular phone terminal 1 and the electric field communication antenna B10 of the cellular phone terminal 2 are in connected state. FIG. 11 shows an example of arrangement when the pair of the electric field communication antenna A01 of the cellular phone terminal 1 and the electric field communication antenna B11 of the cellular phone terminal 2 are in connected state. FIG. 12 shows an example of arrangement when the pair of the electric field communication antenna A00 of the cellular phone terminal 1 and the electric field communication antenna B11 of the cellular phone terminal 2 are in connected state and, similarly, the pair of the electric field communication antenna A01 of the cellular phone terminal 1 and the electric field communication antenna B10 of the cellular phone terminal 2 are in connected state. Finally, FIG. 13 shows an example of arrangement when the pair of the electric field communication antenna A00 of the cellular phone terminal 1 and the electric field communication antenna B10 of the cellular phone terminal 2 are in connected state.

Note that in the present embodiment, in those two cellular phone terminals 1 and 2, which electric field communication antennas on touch panel are paired and in connected state is determined on the basis of a difference in electric field strength among the electric field communication antennas. That is, for example, when described by taking FIG. 5 as an example, electric field strength between the electric field communication antenna A11 of the cellular phone terminal 1 and the electric field communication antenna B01 of the cellular phone terminal 2 is strong. Thus, it is detected that these antennas are in connected state. On the other hand, electric field strength between the electric field communication antennas A00, A01, A10 of the cellular phone terminal 1 and the electric field communication antennas B00, B10, B11 of the cellular phone terminal 2 is weak. Thus, it is detected that these are not in connected state.

Then, in the present embodiment, the cellular phone terminals 1 and 2 carry out data communication through those paired electric field communication antennas in connected state.

According to the first usage example, it is possible to determine which electric field communication antennas among the plurality of electric field communication antenna are in connected state. Thus, it is possible to carry out electric field communication using those electric field communication antennas in connected state.

SECOND USAGE EXAMPLE

In the second usage example, the cellular phone terminals 1 and 2 according to the embodiment of the invention are able to not only determine which electric field communication antennas are paired and in connected state as described above, but also communicate which electric field communication antennas are in connected state in respective terminals to each other between those cellular phone terminal 1 and cellular phone terminal 2 to respectively detect a combination of the paired electric field communication antennas in connected state between those cellular phone terminals 1 and 2, changes of the paired electric field communication antennas in connected state, changes of a combination of the paired electric field communication antennas in connected state, or the like, and then to select an action, such as setting an operation mode of each terminal, launching an application, or moving a cursor on the display, in response to the detected result, such as a combination or a change of the paired electric field communication antennas in connected state.

FIG. 14A to FIG. 16B show examples when a change of the paired electric field communication antennas in connected state is detected from among the plurality of electric field communication antennas formed on the touch panel.

Figure 14A:
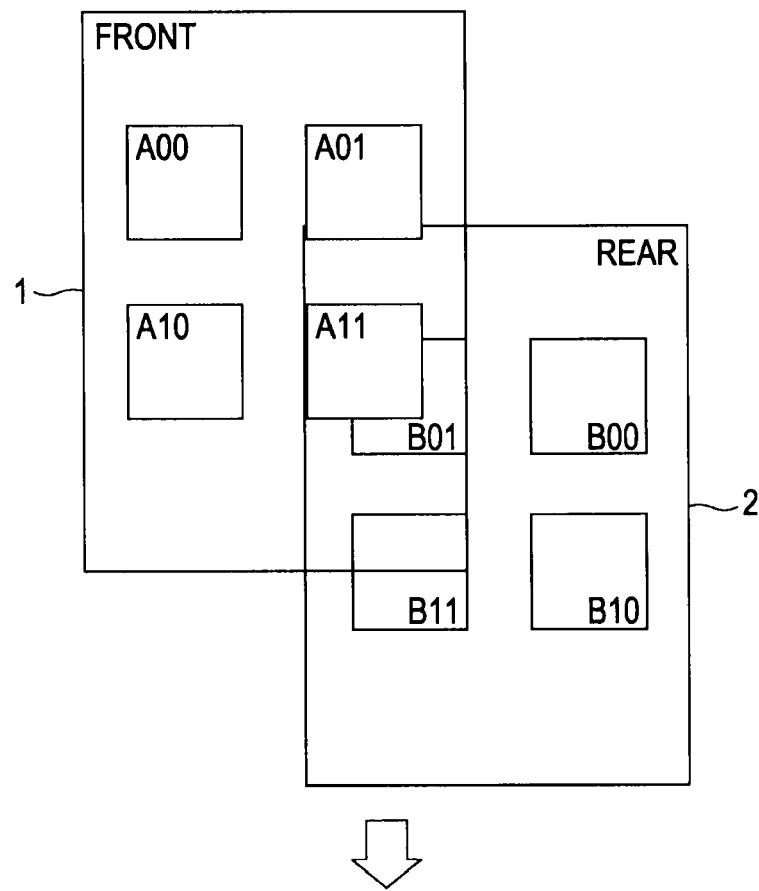
FIG. 14A and FIG. 14B are views that show an example of changing from a state where the electric field communication antennas (A11) and (B01) are paired into a state where the electric field communication antennas (A01) and (B01) are paired and, at the same time, the electric field communication antennas (A11) and (B11) are paired in a second usage example of the embodiment of the invention.
Figure 14B:
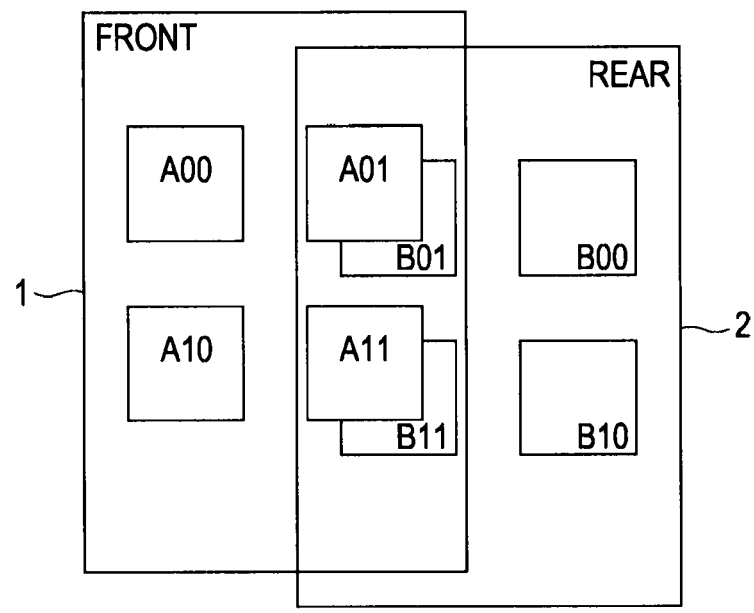

FIG. 14A and FIG. 14B show an example of a change from a state where the electric field communication antenna A11 of the cellular phone terminal 1 and the electric field communication antenna B01 of the cellular phone terminal 2 are paired as shown in FIG. 14A into a state where the electric field communication antenna A01 of the cellular phone terminal 1 and the electric field communication antenna B01 of the cellular phone terminal 2 are paired and, at the same time, the electric field communication antenna A11 of the cellular phone terminal 1 and the electric field communication antenna B11 of the cellular phone terminal 2 are paired as shown in FIG. 14B.

Figure 19:
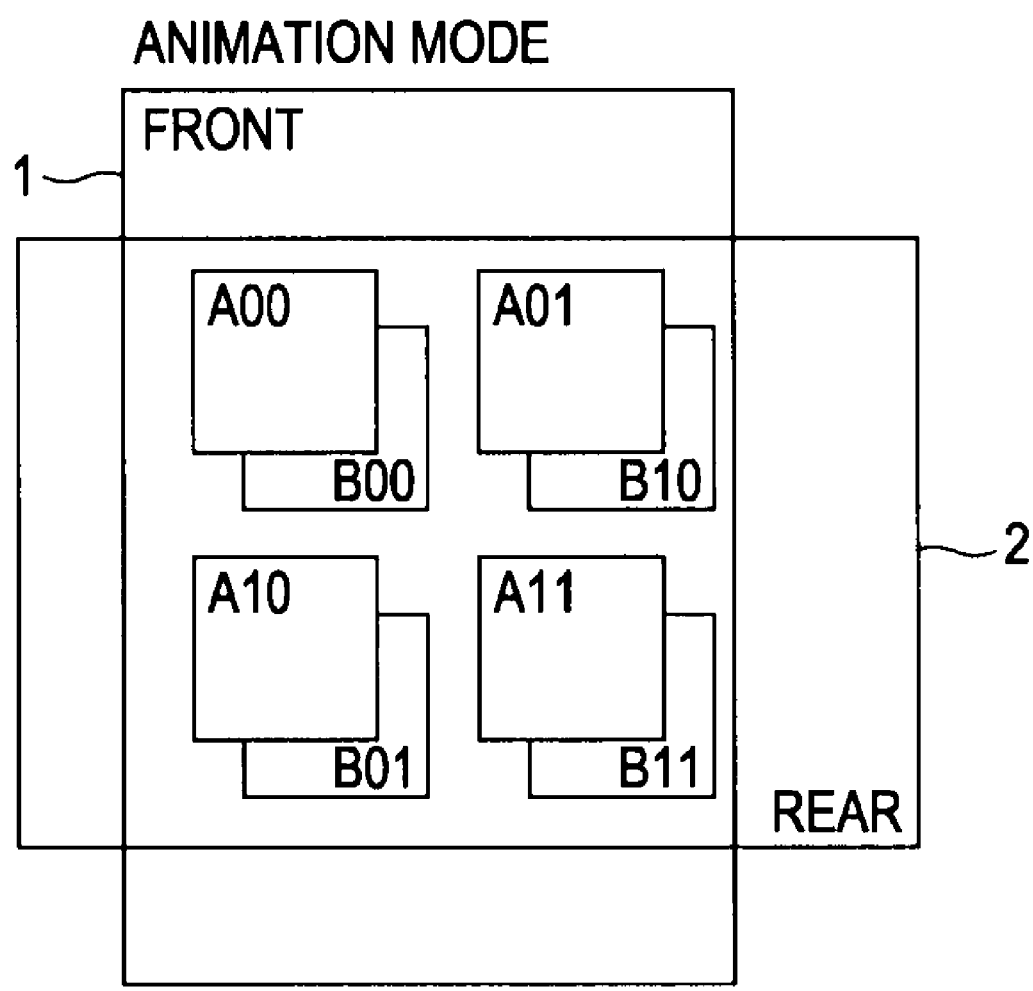
FIG. 19 is a view that shows an example of a combination of paired electric field communication antennas in connected state when an animation mode is set in the second usage example of the embodiment.

In the case of the example of FIG. 14A and FIG. 14B, the cellular phone terminals 1 and 2 according to the present embodiment each check for changes in electric field strength of the electric field communication antennas to detect the electric field communication antenna in connected state and communicate the detected results to each other between the cellular phone terminals 1 and 2 to thereby make it possible to detect a combination of the paired electric field communication antennas in connected state between those cellular phone terminals 1 and 2 or a change of the paired electric field communication antennas in connected state as shown in FIG. 19. Note that in the table of FIG. 15, "1" indicates the case where the electric field communication antennas are paired and in connected state between the cellular phone terminal 1 and the cellular phone terminal 2, "0" indicates the case where the electric field communication antennas are not connected between the cellular phone terminal 1 and the cellular phone terminal 2, and the arrows in the table indicate the lapse of time.

That is, according to the table of FIG. 15, at the time of FIG. 14A, the pair of electric field communication antenna A11 of the cellular phone terminal 1 and electric field communication antenna B01 of the cellular phone terminal 2 are in connected state ("1"), whereas at the time of FIG. 14B, the pair of electric field communication antenna A11 of the cellular phone terminal 1 and electric field communication antenna B01 of the cellular phone terminal 2 are changed to disconnected state ("0"), while, on the other hand, the pair of electric field communication antenna A01 and electric field communication antenna B01 are changed from disconnected state ("0") into connected state ("1") and, similarly, the pair of electric field communication antenna A11 and electric field communication antenna B11 are changed from disconnected state ("0") into connected state ("1"). Thus, the cellular phone terminals 1 and 2 according to the present embodiment monitor changes between connected state and disconnected state as shown in FIG. 15 to thereby make it possible to detect that the cellular phone terminal 1 and the cellular phone terminal 2 are changed from the state of arrangement shown in FIG. 14A into the state of arrangement shown in FIG. 14B.

Figure 16A:
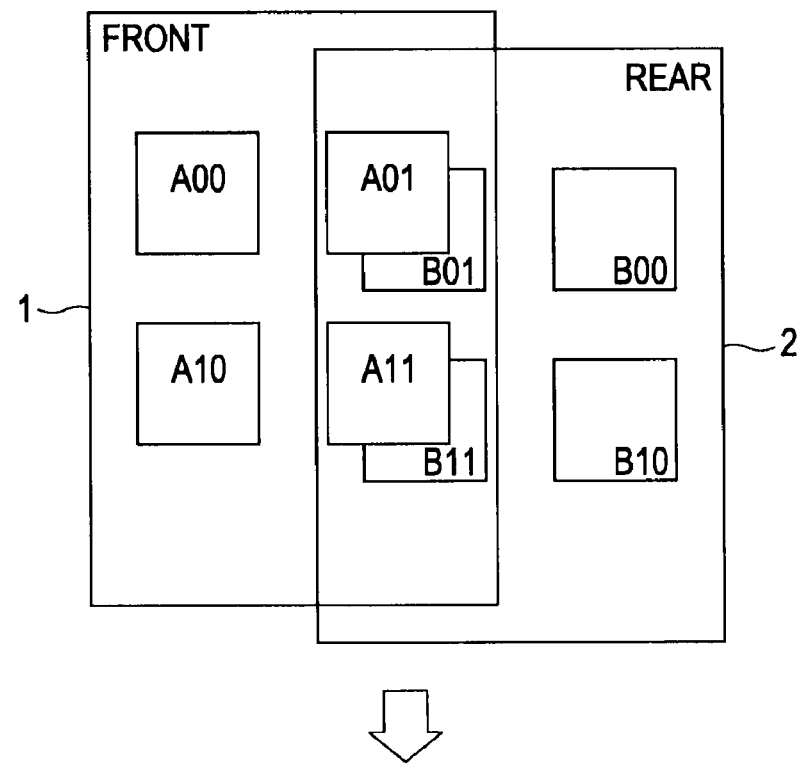
FIG. 16A and FIG. 16B are views that show an example of changing from a state where the electric field communication antennas (A01) and (B01) are paired and the electric field communication antennas (A11) and (B11) are paired into a state where the electric field communication antennas (A01) and (B11) are paired in the second usage example of the embodiment.
Figure 16B:
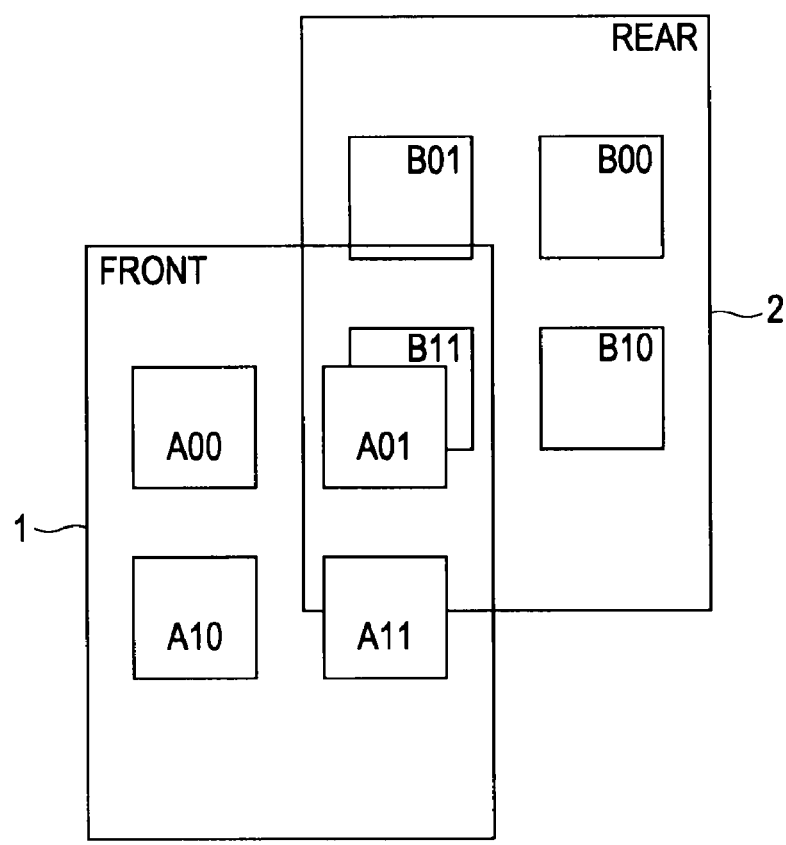

In addition, FIG. 16A and FIG. 16B show an example of a change from a state where the electric field communication antenna A01 of the cellular phone terminal 1 and the electric field communication antenna B01 of the cellular phone terminal 2 are paired and, at the same time, the electric field communication antenna A11 of the cellular phone terminal 1 and the electric field communication antenna B11 of the cellular phone terminal 2 are paired as shown in FIG. 16A into a state where the electric field communication antenna A01 of the cellular phone terminal 1 and the electric field communication antenna B11 of the cellular phone terminal 2 are paired as shown in FIG. 16B.

In the case of the example of FIG. 16A and FIG. 16B, the cellular phone terminals 1 and 2 according to the present embodiment, as shown in FIG. 17 as well as FIG. 15, each monitors changes in electric field strength of the electric field communication antennas to detect changes of the paired electric field communication antennas in connected state.

That is, according to the table of FIG. 17, at the time of FIG. 16A, the pair of electric field communication antenna A01 and electric field communication antenna B01 are in connected state ("1") and, at the same time, the pair of electric field communication antenna A11 and electric field communication antenna B11 are in connected state ("1"), whereas at the time of FIG. 16B, the pair of electric field communication antenna A01 and electric field communication antenna B01 are changed to disconnected state ("0") and, at the same time, the pair of electric field communication antenna A11 and electric field communication antenna B11 are also changed to disconnected state ("0"), while, on the other hand, the pair of electric field communication antenna A01 and electric field communication antenna B11 are changed from disconnected state ("0") into connected state ("1"). Thus, the cellular phone terminals 1 and 2 according to the present embodiment monitor changes between connected state and disconnected state as shown in FIG. 17 to thereby make it possible to detect that the arrangement of the cellular phone terminal 1 and the cellular phone terminal 2 are changed from the state of arrangement shown in FIG. 16A into the state of arrangement shown in FIG. 16B.

FIG. 18 to FIG. 22 show examples of the case where an action, such as automatically selecting and setting an operation mode of the terminal, launching an application, or moving a cursor on the display, is automatically selected in response to a combination of the paired electric field communication antennas in connected state and a change of the paired electric field communication antennas. Note that the following description takes the case where the cellular phone terminal 1 carries out automatic mode selection and setting or automatic action selection as an example.

The table of FIG. 18 shows 16 possible combinations of the paired electric field communication antennas (A00, B00), (A00, B01), (A00, B10), (A00, B11), (A01, B00), (A01, B01), (A01, B10), (A01, B11), (A10, B00), (A10, B01), (A10, B10), (A10, B11), (A11, B00), (A11, B01), (A11, B10) and (A11, B11), and, in those 16 combinations, "1" indicates connected state and "0" indicates disconnected state and then those "1" and "0" are arranged in order of the above 16 combinations to indicate a code like "xxxx, xxxx, xxxx, xxxx". Note that "x" in the above code corresponds to "0" or "1". Then, in the present embodiment, the code is used to automatically set an operation mode of the cellular phone terminal 1 or to automatically select various actions.

Here, in FIG. 18, the "mode 1" and "mode 2" indicate examples of the operation mode of the cellular phone terminal 1, and, for example, the "mode 1" is a music mode and the "mode 2" is an animation mode. Note that in the example of FIG. 18, for example, "0100, 1000, 0001, 0010" is set as a code for setting the cellular phone terminal 1 to the "mode 1" (music mode), and, for example, "1000, 0010, 0100, 0001" is set as a code for setting the cellular phone terminal 1 to the "mode 2" (animation mode).

In addition, in FIG. 18, the "action 1" and "action 2" indicate examples of an action in the cellular phone terminal 1 and, for example, the "action 1" is an action for moving a cursor downward on the display and the "action 2" is an action for moving a cursor upward on the display. Note that in the example of FIG. 18, for example, two codes "0000, 0100, 0000, 0001" and "0000, 0000, 0000, 0100" are set as codes for executing the "action 1", and when the above code is changed from "0000, 0100, 0000, 0001" into "0000, 0000, 0000, 0100", the action for moving a cursor downward on the display is specified. In addition, in the example of FIG. 18, for example, two codes "0000, 0100, 0000, 0001" and "0000, 0001, 0000, 0000" are set as a code for executing the "action 2", and when the above code is changed from "0000, 0100, 0000, 0001" into "0000, 0001, 0000, 0000", the action for moving a cursor upward on the display is specified.

That is, in the present embodiment, when the cellular phone terminal 1 and the cellular phone terminal 2 are arranged to overlap as in the above described example of FIG. 9, the above code is "0100, 1000, 0001, 0010". Thus, when the cellular phone terminal 1 detects this code, the cellular phone terminal 1 automatically sets the operation mode to the "mode 1", that is, music mode.

Similarly, in the present embodiment, when the cellular phone terminal 1 and the cellular phone terminal 2 are, for example, arranged to overlap as shown in FIG. 19, the above code is "1000, 0010, 0100, 0001". Thus, when the cellular phone terminal 1 detects this code, the cellular phone terminal 1 automatically sets the operation mode to the "mode 2", that is, animation mode.

In addition, in the present embodiment, when the cellular phone terminal 1 and the cellular phone terminal 2 are arranged to overlap as shown in FIG. 16A and then shifted into the state as shown in FIG. 16B, the above code changes from "10000, 0100, 0000, 0001" into "0000, 0000, 0000, 0100". Thus, when the cellular phone terminal 1 detects the above change of the code, the cellular phone terminal 1 executes the action for moving a cursor downward on the display.

Figure 20A:
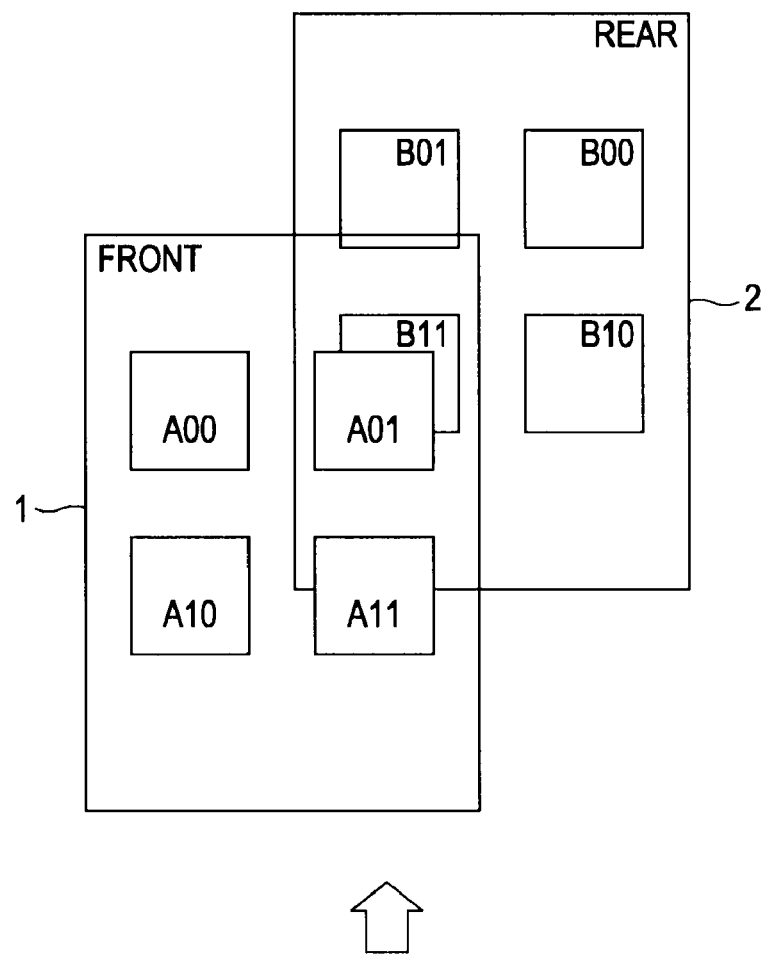
FIG. 20A and FIG. 20B are views that show an example of a change of paired electric field communication antennas in connected state when a cursor is moved upward in the second usage example of the embodiment.
Figure 20B:
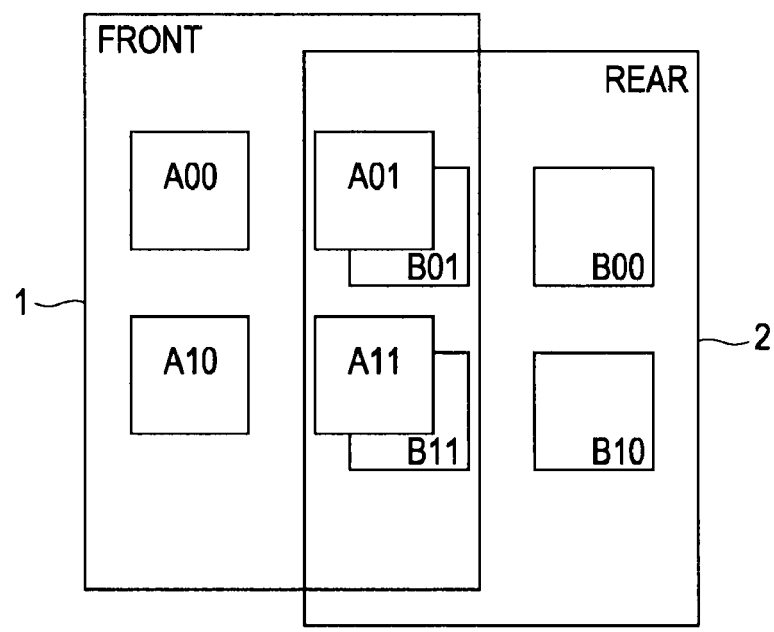

Similarly, in the present embodiment, when the cellular phone terminal 1 and the cellular phone terminal 2 are, for example, arranged to overlap as shown in FIG. 20B and then shifted into the state as shown in FIG. 20A, the code changes from "0000, 0100, 0000, 0001" into "0000, 0001, 0000, 0000". Thus, when the cellular phone terminal 1 detects the above change of the code, the cellular phone terminal 1 executes the action for moving a cursor upward on the display.

Note that the above described modes and actions are just illustrative, and in the present embodiment, further more modes, actions, and the like, are associated with codes. Other than the above, for example, the mode may be set in response to a change of the paired electric field communication antennas in connected state, and, for example, it is also applicable that an application program is launched in response to a combination of the paired electric field communication antennas in connected state or a change of the paired electric field communication antennas. Note that information of correspondence between those modes, actions, and the like, and codes is prepared in the memory unit 16, or the like, as table data, for example, or table data that contain modes, actions, and the like, that are freely associated with codes by a user are recorded in the memory unit 16. As described above, the cellular phone terminal according to the present embodiment is able to automatically set various modes and automatically set various actions on the basis of codes detected at the time when the cellular phone terminal is located adjacent to another terminal.

Flow of Detection of Antennas in Connected State

Figure 21:
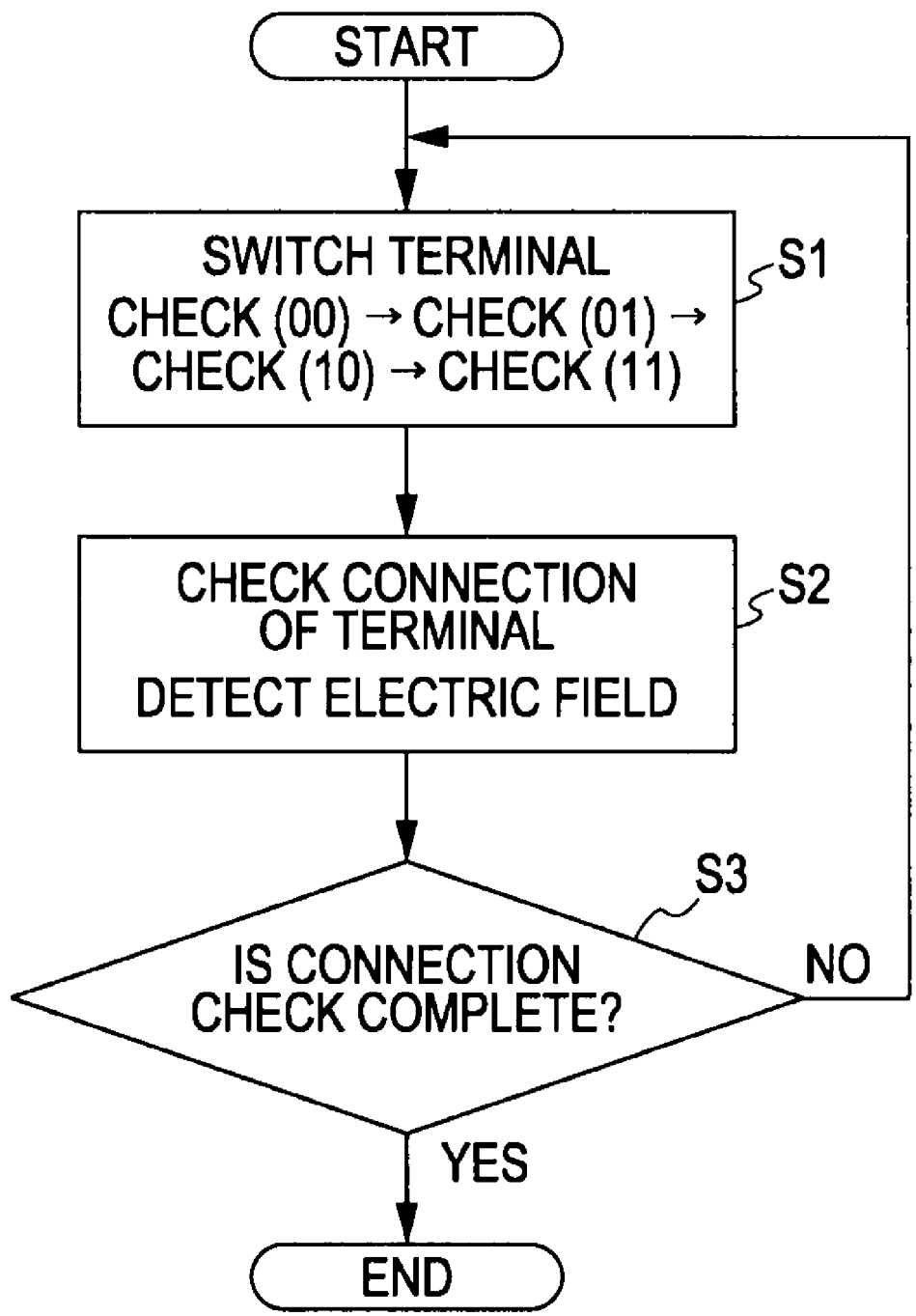
FIG. 21 is a flowchart that shows the process flow for detecting which electric field communication antenna is in connected state among the plurality of electric field communication antennas, formed in the touch panel, in the cellular phone terminal.

FIG. 21 shows the process flow when it is detected which electric field communication antenna is in connected state from among the plurality of electric field communication antennas formed on the touch panel in the cellular phone terminal 1 according to the present embodiment. Note that the flowchart of FIG. 21 is a process that is mainly executed in the touch electric field communication control unit 41 of the cellular phone terminal 1 according to the present embodiment. Note that the following description takes the case where the electric field communication antennas are, for example, formed of four antennas A00 to A11 (that is, connected terminals) as shown in FIG. 4 as an example.

In FIG. 21, in step S1, the touch electric field communication control unit 41 checks for whether the four electric field communication antennas A00 to A11 are in connected state by switching those electric field communication antennas A00 to A11.

That is, in step S2, the touch electric field communication control unit 41 detects, for example, whether an electric field strength is higher than or equal to a predetermined value to thereby check for whether the electric field communication antenna switched in step S1 and the electric field communication antenna of another terminal is in connected state.

Then, in step S3, the touch electric field communication control unit 41 determines whether connected state in regard to all four electric field communication antennas A00 to A11 is checked, and, when all connection check is not complete, returns to step S1 and, when all connection check is complete, ends the process of the flowchart of FIG. 21 and then proceeds to the next process.

Figure 22:
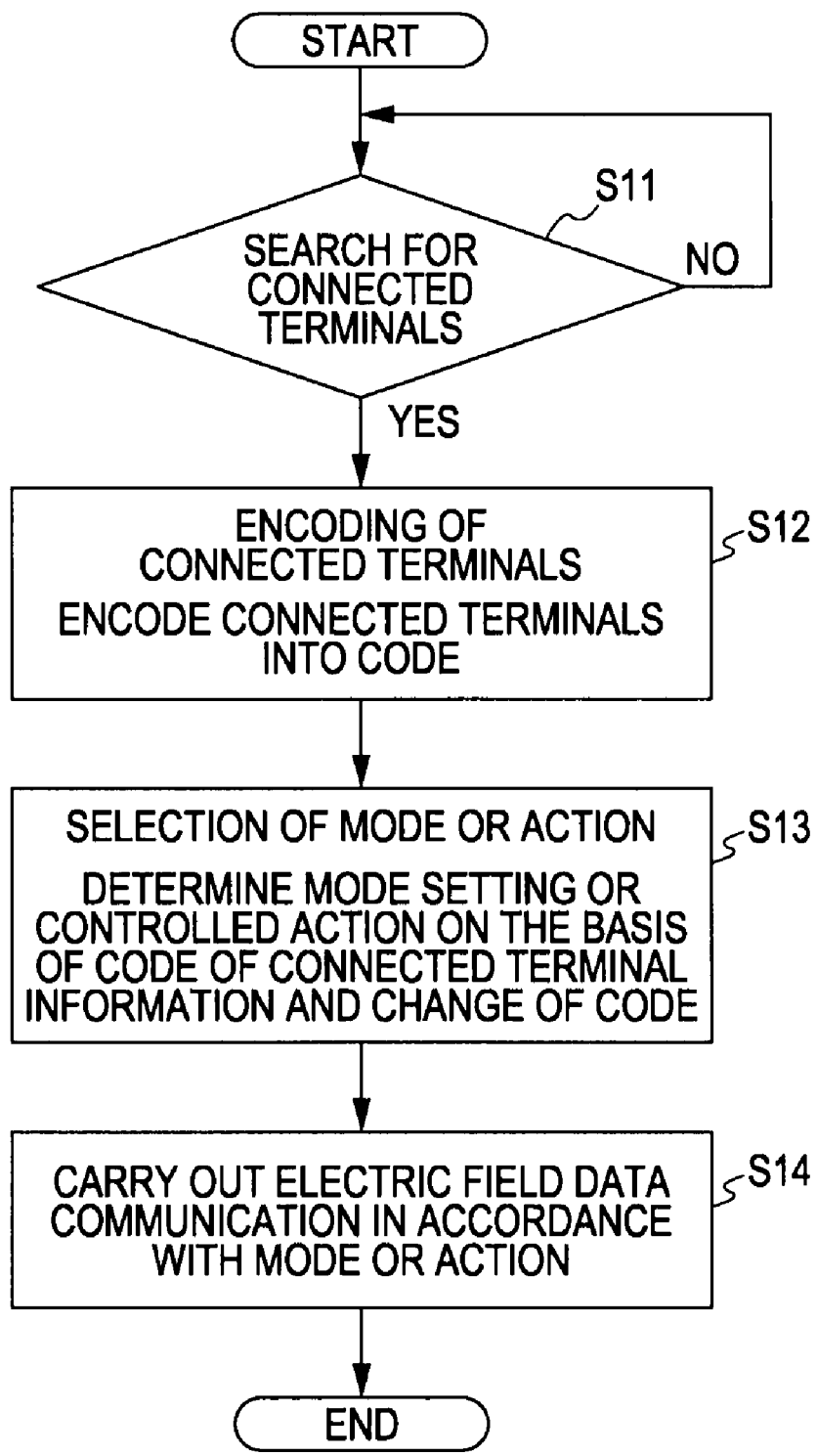
FIG. 22 is a flowchart that shows the process flow for detecting a code and executing a selected mode or action in accordance with the detected code on the basis of a detected result of the connection status of the plurality of electric field communication antennas, formed in the touch panel, in the cellular phone terminal.

Flow of Code Detection and Selection of Mode or Action in Response to Detected Code FIG. 22 shows the process flow when a code is detected and a mode or an action is selected in response to the detected code on the basis of a detected result of connected state in regard to the plurality of electric field communication antennas formed on the touch panel in the cellular phone terminal 1 according to the present embodiment. Note that the flowchart of FIG. 22 is a process that is mainly executed by the control unit 10 of the cellular phone terminal 1 according to the present embodiment.

In FIG. 22, in step S11, the control unit 10 instructs the touch electric field communication control unit 41 to execute searching for connected terminals as described in FIG. 21. At the same time, the control unit 10, when, for example, any one of the electric field communication antennas is in connected state from among the electric field communication antennas formed on the touch panel, controls the touch electric field communication control unit 41 to carry out information communication with the cellular phone terminal 2 through the electric field communication antenna in connected state to thereby communicate information at least indicating which electric field communication antenna is in connected state in each terminal to each other. Note that at this time, where necessary, the cellular phone terminals may communicate information indicating which electric field communication antenna is disconnected to each other. Then, when the searching for connected terminals in step S11 is complete, the control unit 10 proceeds to step S12.

In step S12, the control unit 10 uses the information of the electric field communication antennas in connected state and the electric field communication antenna in disconnected state in the host terminal and the information of the electric field communication antennas in connected state and the electric field communication antenna in disconnected state at the cellular phone terminal 2 side to generate the above described code indicating a combination of the paired electric field communication antennas in connected state.

Next, in step S13, the control unit 10 sets a mode or selects an action as described in FIG. 18 on the basis of the code generated in step S12 and a change of the code.

After that, in step S14, the control unit 10, when data communication is carried out with the cellular phone terminal 2 in the set mode or selected action, carries out data communication by means of electric field communication through the electric field communication antennas in connected state.

Conclusion p As described above, the cellular phone terminal of the embodiment of the invention is equipped with a touch panel that enables various and flexible user input, and, in addition, the touch panel is configured to be usable as an antenna for electrostatic field communication to make it possible to simply carry out high-speed large-amount data transmission within a close distance that can ensure high security.

In the cellular phone terminal according to the present embodiment, electrostatic field communication is carried out using a plurality of electric field communication antennas formed on the touch panel to enable high-speed communication by means of multi-channel communication or multiplexed communication, and, in addition, various terminal controls, such as mode setting or action selection, may be executed by detecting a combination of the paired electric field communication antennas in connected state and/or a change of the paired antennas in connected state to make it possible to effectively utilize high spatial separation and high-speed data transmission characteristic of electric field communication.

Note that the description of the above embodiments is just examples of the invention. Therefore, the embodiments of the invention are not limited to the above described embodiments and may be modified into various forms in response to design, or the like, without departing from the technical idea of the invention.

For example, in FIG. 4, and the like, the example in which the plurality of electric field communication antennas having the same shape are arranged on the touch panel in a grid is illustrated; however, it is not necessary that these plurality of electric field communication antennas all have the same shape and size. Instead, the plurality of electric field communication antennas may have different sizes or shapes and may have various shapes, such as columnar shape. In addition, the arrangement of them are also not limited to the grid-like arrangement.

As an example of that, the touch panel of one terminal includes an electric field communication antenna having a large area, and the touch panel of the other terminal includes an electric field communication antenna having a small area. Then, when both terminals are located adjacent to each other so that the touch panel surfaces of both terminals face each other, a location at which the other terminal is located on the electric field communication antenna having a large area is detected to thereby make it possible to execute a control in response to the location. Note that the control in response to the location includes, in addition to the above described mode setting and action selection, various control examples, such as a display control for moving a cursor, an image, or the like, in a selected direction on the display, or an enlargement/reduction control of a frame image on the display.

Furthermore, as another example, the plurality of electric field communication antennas may be arranged concentrically on the touch panel. In this way, when the plurality of electric field communication antennas are arranged concentrically, for example, the touch panel surface of another similarly configured terminal is located adjacent to the host terminal so as to substantially coincide the center of the concentric circles with each other. Then, those terminals are rotated relatively about the central axis of the concentric circles to thereby make it possible to execute a control in response to that rotation. Note that the control in response to the rotation may include, in addition to the above described mode setting and action selection, various control examples, such as a display control for moving a cursor, an image, or the like, in a circle direction on the display, a display control for rotating an image itself on the display, or a control as in the operation of a so-called disk-shaped jog dial.

Other than the above, the touch panel may be arranged on any one of surfaces or locations on the casing of the cellular phone terminal according to the present embodiment.

In addition, the information communication terminal according to an embodiment of the invention are not limited to the cellular phone terminal according to the above described embodiments; they may also be applied to various terminals, such as a PDA, a remote controller for a car navigation system, a portable game machine, and an AV device.

The present application contains subject matter related to that disclosed in Japanese Priority Patent Application JP 2008-096660 filed in the Japan Patent Office on Apr. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information communication apparatus comprising:
   an electrostatic panel unit that is at least provided with an electrostatically chargeable panel surface;
   a capacitance detection unit that detects a variation in capacitance of the panel surface of the electrostatic panel unit to detect a location at which an object substantially contacts the panel surface;
   an electric field communication unit that uses the panel surface of the electrostatic panel unit as an electrostatic field antenna to carry out electrostatic field communication;
   a connection switching unit that selectively connects any one of the capacitance detection unit and the electric field communication unit to the electrostatic panel unit; and
   a control unit that controls the connection switching unit so as to connect the electrostatic panel unit to the capacitance detection unit at the time of detecting a location at which an object contacts the panel surface of the electrostatic panel unit and to connect the electrostatic panel unit to the electric field communication unit at the time of the electrostatic field communication.

2. The information communication apparatus according to claim 1, wherein
   the electric field communication unit includes
   an electric field communication transmitting unit that changes electrostatic field strength of the panel surface of the electrostatic panel unit in response to a transmission signal of electrostatic field communication;
   an electric field communication receiving unit that detects a variation in electrostatic field strength of the panel surface of the electrostatic panel unit to acquire a signal corresponding to the detected variation in electrostatic field strength as a reception signal of electrostatic field communication; and
   a transmission/reception switching unit that selectively connects any one of the electric field communication transmitting unit and the electric field communication receiving unit to the connection switching unit, and wherein
   the control unit controls the transmission/reception switching unit so as to connect the electric field communication transmitting unit to the connection switching unit at the time of transmitting a signal in electrostatic field communication and to connect the electric field communication receiving unit to the connection switching unit at the time of receiving a signal in electrostatic field communication.

3. The information communication apparatus according to claim 1, wherein
   the electric field communication unit includes a status detecting unit that uses a plurality of areas that are obtained by dividing the panel surface of the electrostatic panel unit as independent electric field communication antennas, respectively, and that detects the electric field communication antenna in connected state where at least electric field communication may be carried out with an electric field communication antenna of another electric field communication apparatus, from among the plurality of electric field communication antennas, and wherein
   the control unit controls an operation of the host information communication apparatus in response to the result detected by the status detecting unit.

4. The information communication apparatus according to claim 3, wherein
   the status detecting unit detects a change of a status indicating whether the electric field communication antennas are in the connected state, and wherein
   the control unit controls an operation of the host information communication apparatus in response to the change of the status detected by the status detecting unit.

5. The information communication apparatus according to claim 3, wherein
   the status detecting unit at least detects a combination of the electric field communication antennas that are in the connected state, and wherein
   the control unit controls an operation of the host information communication apparatus in response to the combination detected by the status detecting unit.

6. The information communication apparatus according to claim 5, wherein
   the status detecting unit at least detects a change of a combination of the electric field communication antennas that are in the connected state, and wherein
   the control unit controls an operation of the host information communication apparatus in response to the change of the combination detected by the status detecting unit.

7. The information communication apparatus according to claim 3, wherein the electric field communication unit carries out multi-channel communication using a plurality of the electric field communication antennas for which the connected state is detected by the status detecting unit.

8. The information communication apparatus according to claim 7, wherein the electric field communication unit carries out multiplexed communication by means of the multi-channel communication.

9. A method of controlling an information communication apparatus, comprising the steps of:
   detecting a variation in capacitance of an electrostatically chargeable panel surface, which is at least provided for an electrostatic panel unit, by a capacitance detection unit to detect a location at which an object substantially contacts the panel surface;
   using the panel surface of the electrostatic panel unit as an electrostatic field antenna to carry out electrostatic field communication by an electric field communication unit; and
   connecting the electrostatic panel unit to the capacitance detection unit by a connection switching unit at the time of detecting a location at which an object contacts the panel surface of the electrostatic panel unit, and connecting the electric field communication unit to the electrostatic panel unit by the connection switching unit at the time of the electrostatic field communication.

* * * * *